United States Patent [19]

Rogers et al.

[11] 4,088,843
[45] May 9, 1978

[54] ELECTRONIC CURRENT FEED CIRCUIT

[75] Inventors: Alastair Stanley Rogers; Norman Thorogood Thurlow, both of Ipswich, England

[73] Assignee: The Post Office, London, England

[21] Appl. No.: 740,087

[22] Filed: Nov. 9, 1976

[30] Foreign Application Priority Data

Nov. 10, 1975 United Kingdom ............... 46375/75

[51] Int. Cl.² .......................................... H04M 19/08
[52] U.S. Cl. .................................... 179/70; 179/16 F; 179/78 R
[58] Field of Search ............. 179/70, 77, 2.5 R, 78 R, 179/16 F, 16 A, 78 A, 79; 323/8, 22 T; 333/78, 79, 8 T, 24 C

[56] References Cited

U.S. PATENT DOCUMENTS

| | | | |
|---|---|---|---|
| 3,035,122 | 5/1962 | Livingstone | 179/16 F |
| 3,916,110 | 10/1975 | Lee et al. | 323/22 T |
| 3,965,447 | 6/1976 | Thomas | 333/80 T |
| 3,993,968 | 11/1976 | Lee | 333/80 T |
| 4,004,104 | 1/1977 | Picandet et al. | 179/70 |
| 4,011,410 | 3/1977 | Thomas | 179/78 R |
| 4,035,586 | 7/1977 | Shirasu et al. | 179/16 F |

*Primary Examiner*—Kathleen H. Claffy
*Assistant Examiner*—Gerald L. Brigance
*Attorney, Agent, or Firm*—Kemon & Estabrook

[57] ABSTRACT

A current feed circuit for a telephone exchange transmission bridge comprising a pair of electronic circuit elements each of which has one terminal connected to a respective one of a pair of telephone lines and another terminal connected to one terminal of an electrical power supply. Each circuit element is a simulated inductance and can provide a resistive path for d.c. current from the power supply to a subscriber's telephone.

9 Claims, 9 Drawing Figures

ELECTRONIC CURRENT FEED CIRCUIT

This invention relates to transmission bridges which are used in telephone exchanges and particularly relates to a current feed circuit for a transmission bridge.

Transmission bridges are used in telephone exchanges to isolate direct current signals flowing on one side of the exchange from those on the other side while providing a low loss transmission path for speech signals through the exchange. When the bridge is connected to the line of a subscriber it has to be able to feed the direct current required for signalling and for energising the carbon granule microphone of the subscriber's telephone.

There are two conventional ways of constructing a transmission bridge depending on the way that the direct current isolation is performed. The first is a capacitor bridge in which direct current isolation is provided by capacitors in series with each line to the telephone. Current feed to the line is from a battery by way of relay coils. The impedance of the coils is sufficient to minimise the shunting effect of the battery on the line.

The second is a transformer bridge in which a transformer provides the d.c. isolation. Current feed to the line is from a battery via relay coils and the transformer coils. The high impedance in this case is provided by the transformer coils. The transformer bridge has a major advantage over the capacitor bridge in that it rejects longitudinal or common made interference reducing the possibility of the build-up over a number of links of very large longitudinal voltages which could affect the transmission and signalling performance. This advantage has made the use of a transformer bridge preferable in many cases even though it is larger and more expensive than a capacitor bridge.

Both of the above types of transmission bridge have the disadvantage that they are relatively bulky.

It is an object of the present invention to provide a current feed circuit for a transmission bridge which enables the bridge to be made much smaller than conventional bridges.

According to the present invention there is provided a current feed circuit for a telephone exchange transmission bridge comprising a pair of electronic circuit elements each of which has one terminal for connection to a respective one of a pair of telephone lines and another terminal for connection to one terminal of an electrical power supply, each circuit element being so arranged that when connected in a transmission bridge it forms a simulated inductance and can provide a resistive path for d.c. current from the power supply to a subscriber's telephone.

Each electronic circuit element may comprise a transistor whose collector-emitter circuit is connected in series with resistive components between said terminals, an operational amplifier whose output is connected to the base of said transistor, a capacitor connected between one of said terminals and the non-inverting input of the operational amplifier, and a resistor connected between said non-inverting input and the collector of the transistor.

The electronic circuit elements may form a balanced network and a single common capacitor forms the capacitor for each circuit.

Each circuit element may include fault sensing means responsive to an overload condition between said terminals to render said circuit element inoperative. Said fault sensing means may comprise a first diode connected between the collector of the transistor and the inverting input of the operational amplifier and a second diode connected between the non-inverting input of the operational amplifier and one of said terminals.

Each electronic circuit element may include a zener diode which is connected to the collector of the transistor to absorb voltage surges.

The current feed circuit may include means for stabilising the power.

The current feed circuit may be used in either a transformer type telephone exchange transmission bridge or a capacitor type telephone exchange transmission bridge.

The invention will be described now by way of example only with particular reference to the accompanying drawings. In the drawings.

Figure 1:
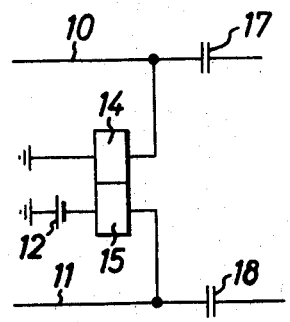
FIG. 1 shows one form of known transmission bridge used in telephone exchanges.
Figure 2:
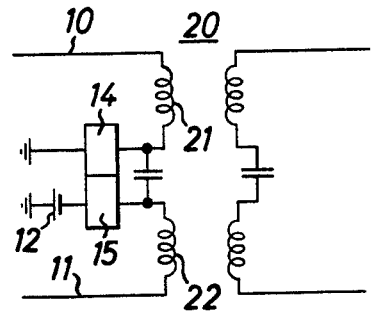
FIG. 2 shows another known form of transmission bridge which is used in telephone exchanges.

FIGS. 1 and 2 each show a known form of transmission bridge used in telephone exchanges. The form shown in FIG. 1 is a capacitor transmission bridge. The bridge is connected to a subscriber's telephone by lines 10 and 11. Current feed to a subscriber's telephone is from a battery 12 which is connected to the lines 10 and 11 by way of relay coils 14, 15. Capacitors 17, 18 connected in the lines 10, 11 isolate direct current signals flowing on one side of the exchange from those on the other side. The impedance of the relay coils are sufficient to minimise the shunting effect of the battery on the line. Typically the resistance of the current feed is 200Ω in each leg to maintain the line current within suitable limits for different lengths of line.

The form of bridge shown in FIG. 2 is a transformer transmission bridge. In this case d.c. isolation is performed by a transformer 20. Current feed is again from a battery 12 by way of relay coils 14, 15 and the coils 21, 22 of the transformer primary. In this bridge the high impedance current feed is provided by the coils 21, 22. The transformer bridge has a major advantage over the capacitor bridge in that it rejects longitudinal or common mode interference thereby reducing the possibility of the build-up over a number of links a very large longitudinal voltages which could affect the transmission and signalling performance. This advantage makes the use of a transformer bridge preferable in many cases even though it is larger and more expensive than a capacitor bridge.

Both of the above known transmission bridge circuits are rather bulky particularly when compared with the electronic circuits.

Figure 3:
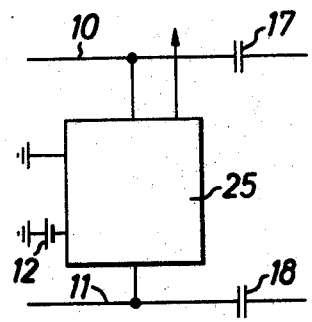
FIG. 3 illustrates schematically a transmission bridge employing a current feed circuit in accordance with the present invention.
Figure 4:
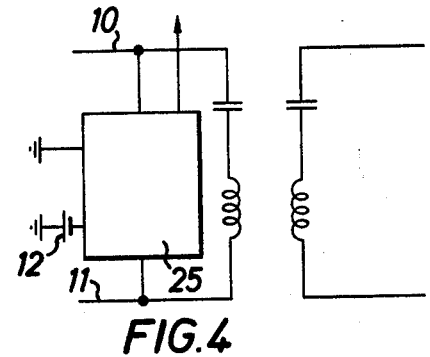
FIG. 4 shows another type of transmission bridge employing a current feed circuit in accordance with the present invention.
Figure 6:
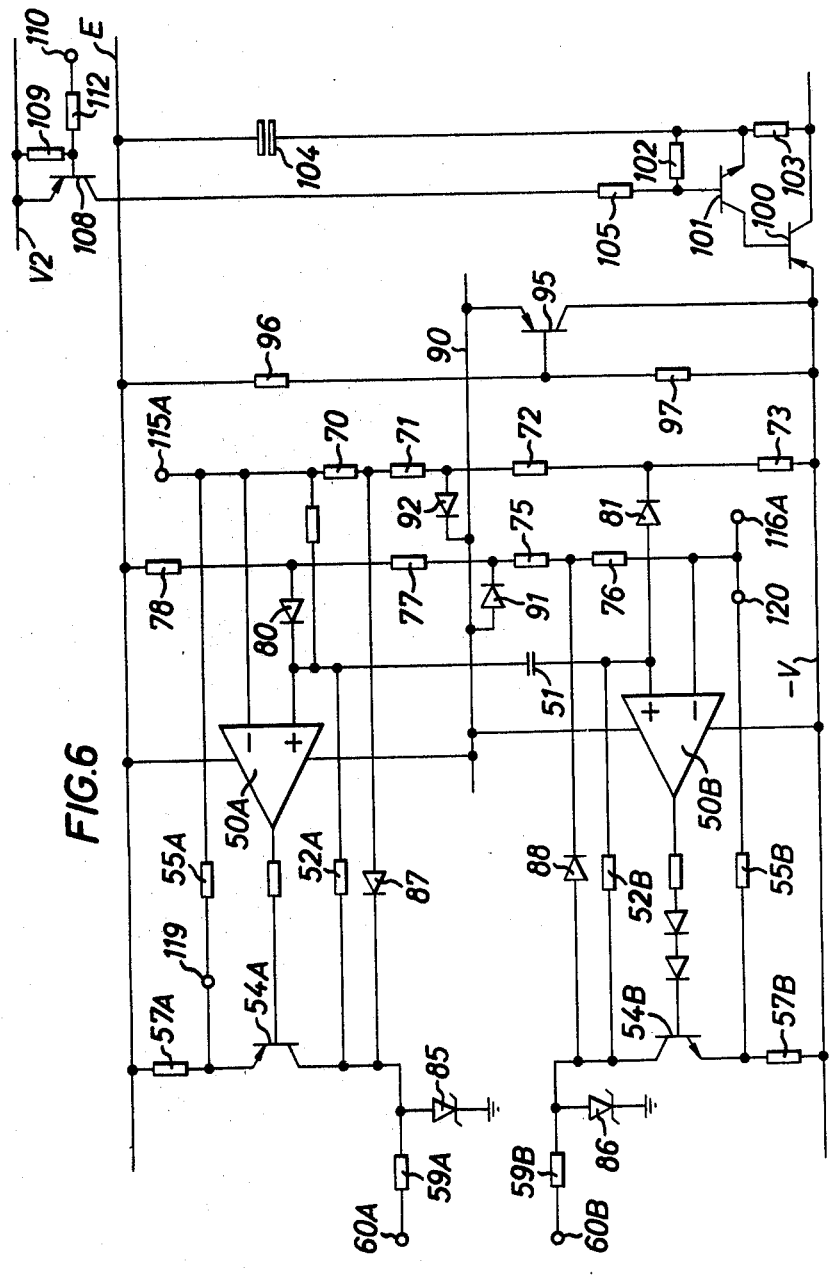
FIG. 6 is a circuit diagram of a current feed circuit in accordance with the present invention.

FIGS. 3 and 4 show respectively a capacitor bridge and a transformer bridge provided with a current feed circuit 25 which employs electronic components. The transformer version of such a transmission bridge can be made relatively small if a parallel line current feed circuit is provided so that no d.c. current flows in the transformer windings which are designed purely for their a.c. characteristics. A parallel line current feed circuit needs to be of low resistance and high a.c. impedance which means employing inductors which provide inductances as large as those provided in known transformer bridges. Large value inductances can be simulated using electronic components and a current feed circuit which uses simulated inductances is shown in FIG. 6. This circuit supplies a direct current through a low resistance but can be connected across the transmission line without any appreciable transmission loss. It can also be used in a capacitor type transmission bridge.

Before describing the circuit of FIG. 6 reference will be made to FIG. 5 which shows the basic simulated inductance used in the circuit of FIG. 6. The simulated inductance comprises an operational amplifier 50, the non-inverting input of which is connected by a capacitor 51 to earth line E and by a resistor 52 to the collector of a transistor 54. The inverting input of the amplifier 50 is connected to the junction of two resistors 55 and 56 which are connected in series with a further resistor 57 between earth line E and supply line −V. The output of the operational amplifier 50 is connected to the base of the transistor 54 and the emitter of the transistor 54 is connected to the junction of the resistors 55 and 57. The collector of the transistor 54 is connected by a resistor 59 to a terminal 60.

Under steady state conditions the inverting input to the operational amplifier 50 is maintained at approximately two volts below the voltage at the emitter of the transistor 54 by the resistor chain 56, 55, 57. The non-inverting input of the amplifier is at substantially the same voltage as the collector of the transistor 54, the current in the resistor 52 being negligible. Since the amplifier 50 operates to equalise the voltages on its two inputs the collector voltage of the transistor 54 will always be maintained at substantially two volts below its emitter voltage. When the resistor 57 has a resistance of 30Ω and the resistor 59 a resistance of 120Ω the d.c. characteristics of the circuit of FIG. 5 are defined as a resistance of 150Ω in a series with a constant two volts.

Figure 5:
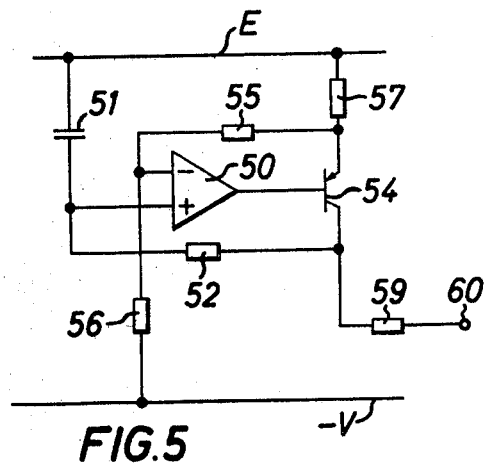
FIG. 5 is a circuit diagram of a simulated inductance circuit used in a current feed circuit in accordance with the present invention.

The a.c. characteristics of the circuit of FIG. 5 can be best understood by considering the application of a voltage step V1 between the terminal 60 and earth line E. When such a voltage step is applied the current through resistor 59 does not change instantaneously becaue the capacitor 51 prevents the voltage at the inputs of the operational amplifier 50 from changing. The capacitor 51 begins to charge slowly through the resistor 52 at an initial rate of V1/(C51 × R52) volts per second where C51 is the capacitance of the capacitor 51 and R52 is the resistance of the resistor 52. The voltage at the emitter of the transistor 54 changes at the same rate so that the current through resistor 59 starts to change at a rate of V1/(C51 × R52 × R57) amps per second where R57 is the resistance of the resistor 57.

Thus the circuit shown in FIG. 5 appears as an inductance of C51 × R52 × R57 Henries connected between the terminal 60 and earth line E.

Referring now to FIG. 6 the current feed circuit employes two of the circuits of FIG. 5 connected in a balanced configuration. Components corresponding to those of FIG. 5 are shown by like reference numerals the components of the two simulated inductances being distinguished by the references A and B. A common capacitor 51 is employed for the two simulated inductance circuits to provide an improved balance. In the case of the simulated inductance having the operational amplifier 50A the resistor 56 is constituted by two resistors 70 and 71 which form part of a resistance chain 70, 71, 72 and 73 connected between supply line V and resistor 55A. In the case of the simulated inductance having the amplifier 50B the resistor 56 is constituted by two resistors 75 and 76 which form part of a resistance chain 75, 76, 77 and 78 connected between earth line E and the resistor 55B. A diode 80 is connected between the non-inverting input of the amplifier 50A and the junction of resistor 77 and 78 and a diode 81 is connected between the non-inverting input of the amplifier 50B and the junction of resistors 72 and 73. A diode 87 is connected between the collector of the transistor 54A and the junction of the resistors 70 and 71 and a diode 88 is connected between the collector of the transistor 54B and the junction of the resistors 75 and 76.

Each simulated inductance circuit has a zener diode 85, 86 which is connected between earth and the collector of the transistor 54A, 54B.

A line 90 is maintained at a potential of substantially V/2 by connection to the emitter of a transistor 95 and is used as a voltage reference for diodes 91 and 92 whose purpose is to define the overload characteristics of the circuits. The diodes 91 and 92 are connected respectively to the junction of the resistors 75 and 77 and the junction of the resistors 71 and 72. The collector of the transistor 95 is connected to line V. The base of the transistor 95 is connected to the junction of two resistors 96, 97 which are connected in series between earth line E and supply line V.

Stabilisation for the power supply to the circuit is provided by an arrangement consisting of transistors 100 and 101, resistors 102 and 103 and a capacitor 104. The junction of the resistor 102 and the base of the transistor 101 is connected by a resistor 105 to the collector of a transistor 108 the emitter of which is connected to a supply line V2. The base of the transistor 108 is connected to a supply line V2 by a resistor 109 and to a terminal 110 by a resistor 112.

The current feed circuit of FIG. 6 is connected to form a transmission bridge by connecting the terminal 60A to the line 10 of FIG. 3 or FIG. 4 and the terminal 60B to the line 11 of FIG. 3 or FIG. 4. Such an arrangement acts as a current feed for a subscriber's telephone and also acts as an impedance for a.c. speech signals transmitted to the exchange. By appropriately selecting the values of resistors 57A, 59A, and 57B, 59B each part of the current feed circuit can be made to behave as 150Ω in series with the constant two volts. The circuit can then provide a suitable transmitter current which is within the required limits for all lengths of line normally used. The current feed characteristic of the circuit of FIG. 6 is very similar to that of existing feed circuits.

When a.c. speech signals are transmitted along lines 10, 11 there is a relative voltage change between the collectors of the transistors 54A and 54B so that the capacitor 51 charges and discharges in a similar manner to a single circuit. However, under longitudinal, i.e. common mode noise, signals there is no relative voltage change between the collector of the transistors 54A and 54B and the complete circuit behaves as a 150Ω resistor connected between each line and earth. This provides considerable attenuation to longitudinal hum and noise voltages allowing the circuit to operate on lines subject to such interference.

Figure 7:
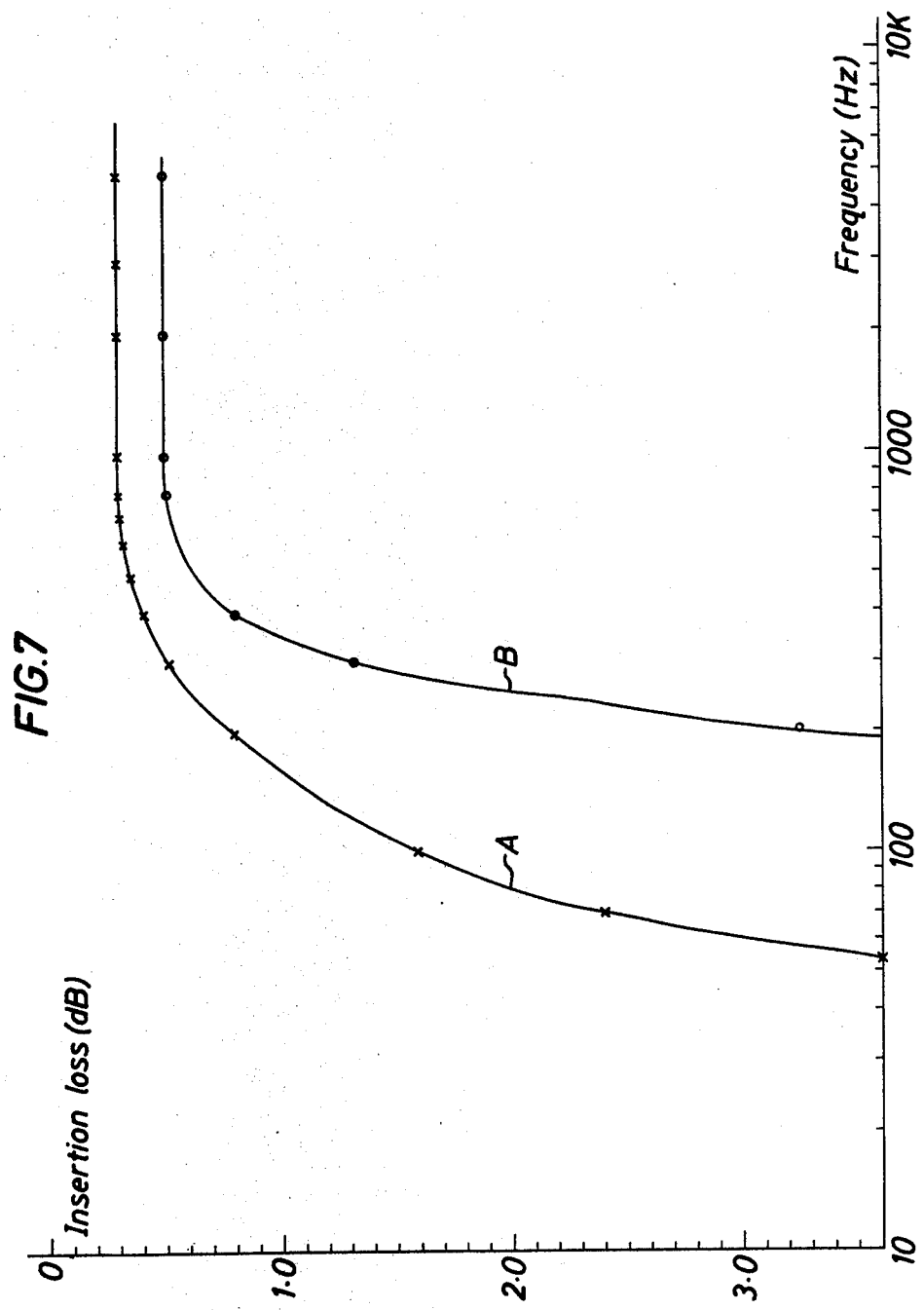
FIG. 7 is a plot which compares the insertion loss of a transformer bridge provided with the present current feed circuit with the insertion loss of a conventional transformer bridge.
Figure 8:
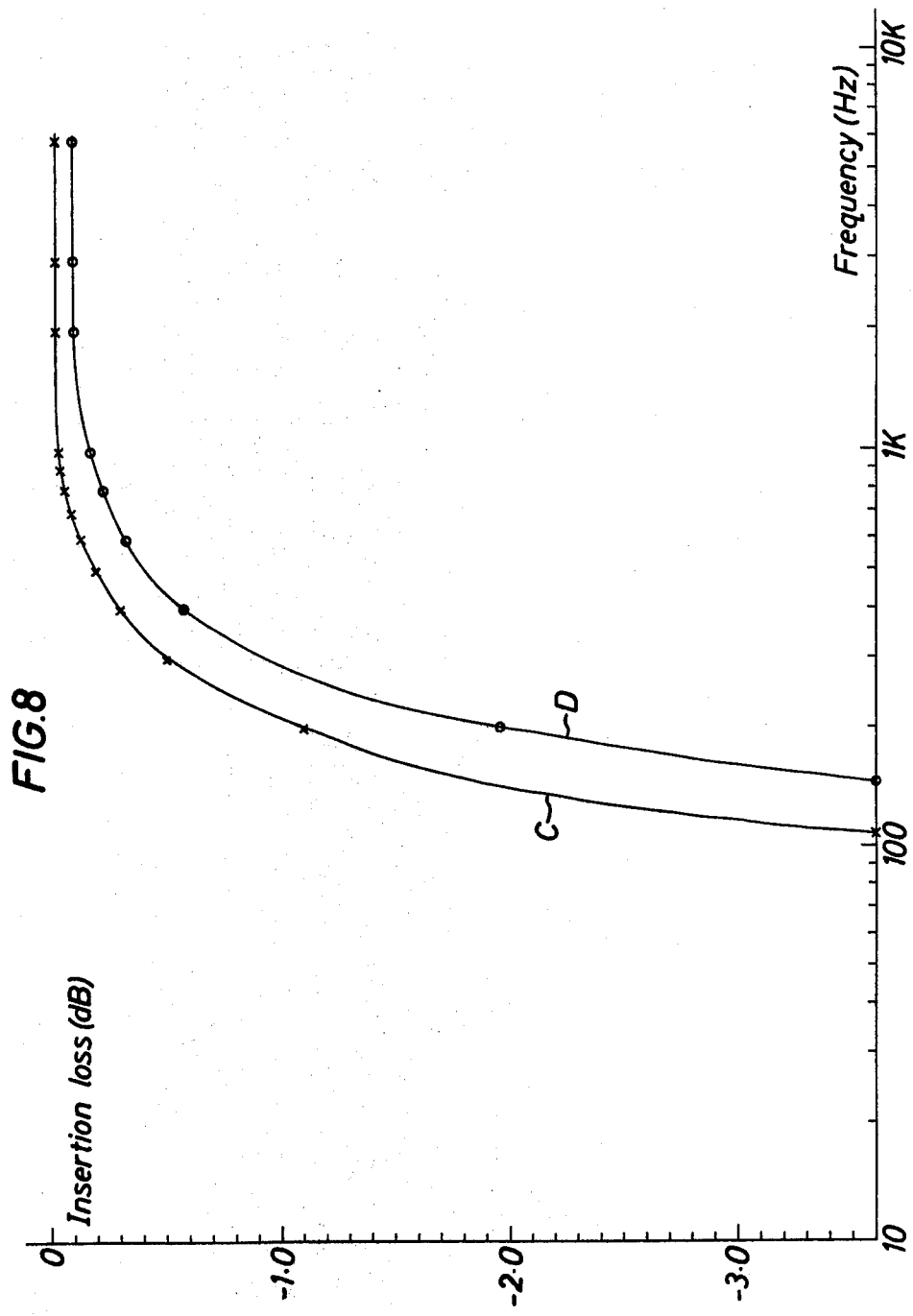
FIG. 8 is a plot which compares the insertion loss of a capacitor bridge provided with the present current feed circuit with the insertion loss of a conventional capacitor bridge.

The impedance presented by the circuit of FIG. 6 to transverse speech signals is equivalent to about 2.5 Henries so that the insertion loss of the circuit is very small (less than 0.1db at 300Hz). Most of the loss in the transmission bridge is then caused by the transformer or capacitors. FIGS. 7 and 8 respectively show the insertion loss of transformer and capacitor bridges using the present current feed circuit compared with the insertion loss in conventional transmission bridge circuits. In FIG. 7 curve A represents the insertion loss of a transformer transmission bridge having the present electronic current feed circuit and curve B represents the insertion loss of a conventional transmission bridge whilst in FIG. 8 curve C represents the insertion loss of a capacitor transmission bridge having the present electronic current feed circuit and curve D represents the insertion loss of a conventional capacitor transmission bridge.

The use of an electronic current feed circuit enables other features to be provided which will now be referred to. The circuit has protection for short circuit fault conditions. The resistance of a telephone can reduce to as low as 50Ω so it is difficult to design a circuit which will cut off under short circuit fault conditions but not affect the operation of a telephone on a very short line. D.C. fault protection therefore has been limited to protecting against fault conditions applying an earth to terminal 60B or −V volts to terminal 60A. The operation of the protection elements in the present circuit can be seen by considering a situation when a variable resistance is connected between for example terminal 60B and earth. When this resistance decreases the current increases until it is limited by the diode 81 becoming conductive. As the resistance decreases still further the current remains almost constant but the voltage across the transistor 54B increases until the diode 88 becomes conductive. When the diode 88 conducts it pulls the inverting input of the operational amplifier 50B positive so that the amplifier causes the transistor 54B to become non-conductive. This renders the circuit inoperative. As soon as the fault is removed the circuit will automatically become operational again. The protection on the other part of the circuit operates in a similar manner if a −V volts battery fault occurs.

Protection against lightening strikes and induced voltage surges is provided by the zener diodes 85 and 86. Any of a number of suitable zener diodes can be used depending upon the surge rating required.

In applications where line current is fed from a supervisory unit via reed relay crosspoints, it is necessary to ensure that the reeds do not actually switch the line current. This can be done by providing heavy duty contacts to switch the line currents after the reed relay crosspoints have been operated. However with an electronic current feed circuit it is possible to switch off the current electronically while the crosspoints are being operated. The electronic switch is provided by the transistor 108 and is controlled by voltages applied to terminal 110.

Figure 9:
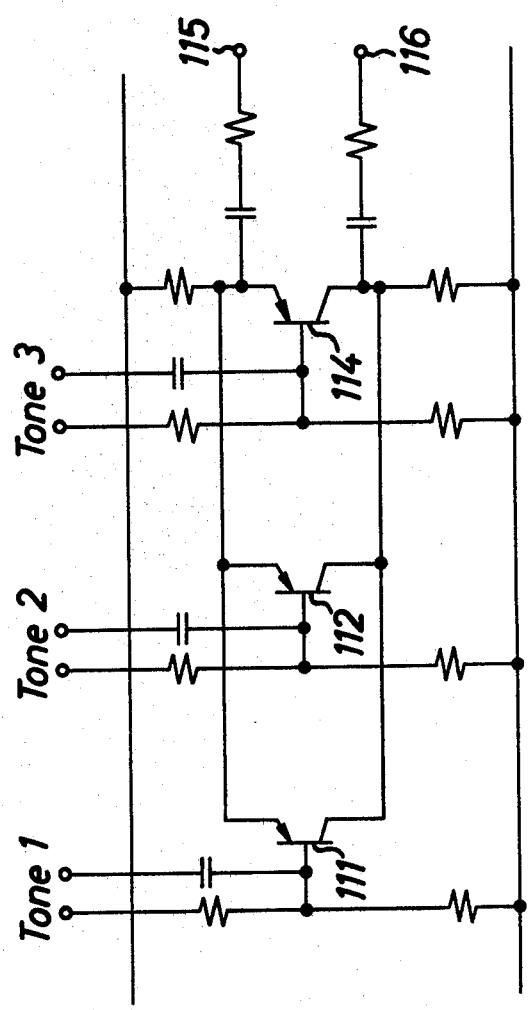
FIG. 9 is a circuit diagram of a circuit for feeding tone signals to the circuit of FIG. 6.

In conventional transmission bridges tones are usually sent to line from a third winding on the transformer or from an extra relay coil. However with an electronic current feed circuit it is possible to send tones directly to the line from the circuit. The tones are fed to the circuit via a transistor which acts as a switch controlled by external voltages and also as a phase splitter to provide a balanced signal. A number of tones can be provided by using one transistor for each tone and switching these in when required. Such a circuit is illustrated in FIG. 9. This circuit has three transistor switches 111, 112, 114 and the tone signals appear at terminals 115, 116. These terminals are connected to the points 115A and 116A on the circuit of FIG. 6.

A signal detector circuit can be connected to the points 119, 120 (FIG. 6) to detect for example loop/disconnect pulses for dialling and coin signals from coin boxes. Such a detector circuit forms the subject of our copending application Ser. No. 744,390, filed Nov. 23, 1976

We claim:

1. A current feed circuit for a telephone exchange transmission bridge comprising: a pair of electronic circuit elements which form a balanced network, each circuit element having one terminal for connection to a respective one of a pair of telephone lines and another terminal for connection to one terminal of an electrical power supply, each circuit element being so arranged that when connected in a transmission bridge it forms a simulated inductance and can provide a resistive path for d.c. current from the power supply to a subscriber's telephone, each circuit element including an operational amplifier having a non-inverting input, and a common capacitor connected between the operational amplifiers.

2. A current feed circuit for a telephone exchange transmission bridge as claimed in claim 1, wherein each said electronic circuit element comprises a transistor having a collector-emitter circuit connected in series with resistive components between said terminals, the operational amplifier output being connected to the base of said transistor, and a resistor connected between said non-inverting input and the collector of said transistor.

3. A current feed circuit for a telephone exchange transmission bridge as claimed in claim 2, wherein each circuit element includes fault sensing means responsive to an overload condition between said terminals to render said circuit element inoperative.

4. A current feed circuit for a telephone exchange transmission bridge as claimed in claim 3, wherein said fault sensing means comprise a first diode connected between the collector of said transistor and the inverting input of the operational amplifier and a second diode connected between the non-inverting input of the operational amplifier and one of said terminals.

5. A current feed circuit for a telephone exchange transmission bridge as claimed in claim 2, wherein each electronic circuit element includes a zener diode connected to the collector of said transistor to absorb voltage surges.

6. A current feed circuit for a telephone exchange transmission bridge as claimed in claim 1, wherein said electrical power supply is stabilized.

7. A telephone exchange transmission bridge including a current feed circuit as claimed in claim 1.

8. A telephone exchange transmission bridge as claimed in claim 7, wherein said bridge is a transformer bridge.

9. A telephone exchange transmission bridge as claimed in claim 7, wherein said bridge is a capacitor bridge.

* * * * *